US008572626B2

(12) United States Patent
Van Der Veen (10) Patent No.: US 8,572,626 B2
(45) Date of Patent: *Oct. 29, 2013

(54) SYMMETRIC MULTI-PROCESSOR SYSTEM (75) Inventor: Peter Van Der Veen, Ottawa (CA)

(73) Assignee: QNX Software Systems Limited, Kanata, Ontario (CA)

( * ) Notice: Subject to any disclaimer, the term of this patent is extended or adjusted under 35 U.S.C. 154(b) by 118 days.

This patent is subject to a terminal disclaimer.

(21) Appl. No.: 13/198,461

(22) Filed: Aug. 4, 2011

(65) Prior Publication Data

US 2011/0289511 A1 Nov. 24, 2011

Related U.S. Application Data (63) Continuation of application No. 11/515,675, filed on Sep. 5, 2006, now Pat. No. 7,996,843, which is a continuation of application No. 09/383,115, filed on Aug. 25, 1999, now Pat. No. 7,103,631.

(51) Int. Cl.
*G06F 9/44* (2006.01)
*G06F 9/46* (2006.01)
*G06F 13/00* (2006.01)

(52) U.S. Cl.
USPC ........... 718/107; 718/104; 718/108; 711/153; 719/312

(58) Field of Classification Search
USPC ............... 718/1–106; 719/311–320, 328–330
See application file for complete search history.

(56) References Cited

U.S. PATENT DOCUMENTS

| | | | |
|---|---|---|---|
| 4,394,727 A | 7/1983 | Hoffman et al. | |
| 4,480,304 A | 10/1984 | Carr et al. | |
| 5,125,093 A | 6/1992 | McFarland | |
| 5,161,227 A | 11/1992 | Dias et al. | |
| 5,179,702 A | 1/1993 | Spix et al. | |
| 5,202,991 A | 4/1993 | Gamache et al. | |
| 5,237,673 A | 8/1993 | Orbits et al. | |
| 5,247,675 A | 9/1993 | Farrell et al. | |
| 5,269,013 A | 12/1993 | Abramson et al. | |
| 5,390,328 A | 2/1995 | Frey et al. | |
| 5,452,452 A | 9/1995 | Gaetner et al. | |
| 5,452,459 A * | 9/1995 | Drury et al. ........................... 1/1 |
| 5,506,987 A | 4/1996 | Abramson et al. | |
| 5,515,538 A | 5/1996 | Kleiman | |

(Continued)

OTHER PUBLICATIONS

"Architecture Specific Code for the Intel MP Port"; May 28, 1996; 5 pages.
Buehler, S.; "Novell SMP: A Step Slow?"; PC Magazine; Jun. 25, 1996; 2 pages.
"Execution Model"; Utah Flux Project; Jul. 17, 1998; 4 pages.

(Continued)

*Primary Examiner* — Abdullah Al Kawsar
(74) *Attorney, Agent, or Firm* — Brinks Hofer Gilson & Lione (57) ABSTRACT

The present invention relates generally to computer operating systems, and more specifically, to operating system calls in a symmetric multiprocessing (SMP) environment. Existing SMP strategies either use a single lock or multiple locks to limit access to critical areas of the operating system to one thread at a time. These strategies suffer from a number of performance problems including slow execution, large software and execution overheads and deadlocking problems. The invention applies a single lock strategy to a micro kernel operating system design which delegates functionality to external processes. The micro kernel has a single critical area, the micro kernel itself, which executes very quickly, while the external processes are protected by proper thread management. As a result, a single lock may be used, overcoming the performance problems of the existing strategies.

24 Claims, 7 Drawing Sheets

(56) References Cited

U.S. PATENT DOCUMENTS

| | | |
|---|---|---|
| 5,517,648 A | 5/1996 | Bertone et al. |
| 5,522,069 A | 5/1996 | Bertone et al. |
| 5,526,521 A | 6/1996 | Fitch et al. |
| 5,535,365 A | 7/1996 | Barriuso et al. |
| 5,577,261 A * | 11/1996 | Harinarayan et al. ........ 718/102 |
| 5,579,512 A | 11/1996 | Goodrum et al. |
| 5,583,987 A | 12/1996 | Kobayashi et al. |
| 5,590,326 A * | 12/1996 | Manabe .................. 711/150 |
| 5,596,754 A | 1/1997 | Lomet |
| 5,682,537 A | 10/1997 | Davies et al. |
| 5,721,922 A | 2/1998 | Dingwall |
| 5,724,527 A | 3/1998 | Karnik et al. |
| 5,742,825 A | 4/1998 | Mathur et al. |
| 5,771,382 A | 6/1998 | Wang et al. |
| 5,812,844 A | 9/1998 | Jones et al. |
| 5,815,651 A | 9/1998 | Litt |
| 5,832,262 A | 11/1998 | Johnson et al. |
| 5,860,002 A | 1/1999 | Huang |
| 5,860,101 A | 1/1999 | Arimilli et al. |
| 5,892,944 A * | 4/1999 | Fukumoto et al. ............ 718/100 |
| 5,893,163 A | 4/1999 | Arimilli et al. |
| 5,935,230 A | 8/1999 | Pinai et al. |
| 5,946,487 A | 8/1999 | Dangelo |
| 5,950,228 A | 9/1999 | Scales et al. |
| 5,964,838 A | 10/1999 | Cheung et al. |
| 5,966,543 A | 10/1999 | Hartner et al. |
| 5,987,587 A | 11/1999 | Meltzer |
| 5,991,819 A | 11/1999 | Young |
| 6,009,521 A | 12/1999 | Huang |
| 6,038,642 A | 3/2000 | Arimilli et al. |
| 6,038,651 A | 3/2000 | Van Huben et al. |
| 6,041,377 A | 3/2000 | Mayer et al. |
| 6,047,355 A | 4/2000 | Wu et al. |
| 6,073,182 A | 6/2000 | Jones et al. |
| 6,075,938 A | 6/2000 | Bugnion et al. |
| 6,075,939 A | 6/2000 | Bunnell et al. |
| 6,078,944 A | 6/2000 | Enko et al. |
| 6,088,771 A | 7/2000 | Steely, Jr. et al. |
| 6,092,097 A | 7/2000 | Suzuoka |
| 6,094,710 A | 7/2000 | Arimilli et al. |
| 6,105,049 A | 8/2000 | Govindaraju et al. |
| 6,105,050 A | 8/2000 | Govindaraju et al. |
| 6,112,222 A | 8/2000 | Govindaraju et al. |
| 6,119,115 A | 9/2000 | Barr |
| 6,167,423 A | 12/2000 | Chopra et al. |
| 6,179,489 B1 | 1/2001 | So et al. |
| 6,195,676 B1 | 2/2001 | Spix et al. |
| 6,205,528 B1 | 3/2001 | Kingsbury et al. |
| 6,216,216 B1 | 4/2001 | Bonola |
| 6,226,671 B1 | 5/2001 | Hagersten et al. |
| 6,247,143 B1 | 6/2001 | Williams |
| 6,249,830 B1 | 6/2001 | Mayer et al. |
| 6,275,893 B1 | 8/2001 | Bonola |
| 6,292,705 B1 | 9/2001 | Wang et al. |
| 6,298,370 B1 | 10/2001 | Tang et al. |
| 6,308,255 B1 | 10/2001 | Gorishek, IV et al. |
| 6,370,606 B1 | 4/2002 | Bonola |
| 6,393,590 B1 | 5/2002 | Wood et al. |
| 6,438,573 B1 | 8/2002 | Nilsen |
| 6,449,699 B2 | 9/2002 | Franke et al. |
| 6,457,085 B1 | 9/2002 | Reddy |
| 6,466,825 B1 | 10/2002 | Wang et al. |
| 6,480,919 B2 | 11/2002 | Bonola |
| 6,484,224 B1 | 11/2002 | Robins et al. |
| 6,505,269 B1 | 1/2003 | Potter |
| 6,505,286 B1 | 1/2003 | Kingsbury et al. |
| 6,510,496 B1 | 1/2003 | Tarui et al. |
| 6,516,379 B1 | 2/2003 | Deshpande et al. |
| 6,516,442 B1 | 2/2003 | Wang et al. |
| 6,523,076 B1 | 2/2003 | Kruse |
| 6,529,990 B1 | 3/2003 | Kruse et al. |
| 6,535,941 B1 | 3/2003 | Kruse |
| 6,542,949 B1 | 4/2003 | Kruse |
| 6,574,725 B1 | 6/2003 | Kranich et al. |
| 6,587,955 B1 | 7/2003 | Foote et al. |
| 6,591,348 B1 | 7/2003 | Deshpande et al. |
| 6,601,146 B2 | 7/2003 | Auslander et al. |
| 6,606,676 B1 | 8/2003 | Deshpande et al. |
| 6,615,323 B1 | 9/2003 | Petersen et al. |
| 6,633,945 B1 | 10/2003 | Fu et al. |
| 6,687,762 B1 * | 2/2004 | Van Gaasbeck et al. ..... 719/319 |
| 6,725,307 B1 | 4/2004 | Alvarez, II et al. |
| 6,738,870 B2 | 5/2004 | Van Huben et al. |
| 6,738,871 B2 | 5/2004 | Van Huben et al. |
| 6,738,872 B2 | 5/2004 | Van Huben et al. |
| 6,766,515 B1 * | 7/2004 | Bitar et al. .................... 718/100 |
| 6,779,036 B1 | 8/2004 | Deshpande |
| 6,785,888 B1 * | 8/2004 | McKenney et al. ........... 718/104 |
| 6,789,214 B1 | 9/2004 | De Bonis-Hamelin et al. |
| 6,804,815 B1 | 10/2004 | Kerr et al. |
| 6,813,694 B2 | 11/2004 | Arimilli et al. |
| 6,826,654 B2 | 11/2004 | Arimilli et al. |
| 6,826,655 B2 | 11/2004 | Arimilli et al. |
| 6,865,688 B2 | 3/2005 | Dawkins et al. |
| 6,886,031 B2 | 4/2005 | Venkatsubramanian et al. |
| 6,904,594 B1 | 6/2005 | Berry et al. |
| 6,910,062 B2 | 6/2005 | Arimilli et al. |
| 6,938,247 B2 | 8/2005 | Czajkowski |
| 6,957,432 B2 | 10/2005 | Ballantyne |
| 6,988,173 B2 | 1/2006 | Blake et al. |
| 6,990,665 B2 | 1/2006 | Ballantyne |
| 7,017,011 B2 | 3/2006 | Lesmanne et al. |
| 7,039,739 B2 | 5/2006 | Bonola |
| 7,073,043 B2 | 7/2006 | Arimilli et al. |
| 7,073,089 B2 | 7/2006 | Wyld |
| 7,080,242 B2 | 7/2006 | Morris |
| 7,082,508 B2 | 7/2006 | Khan et al. |
| 7,085,898 B2 | 8/2006 | Blake et al. |
| 7,086,058 B2 | 8/2006 | Luick |
| 7,103,631 B1 | 9/2006 | van der Veen |
| 7,194,586 B2 | 3/2007 | Brown et al. |
| 7,213,169 B2 | 5/2007 | Dodson et al. |
| 7,222,270 B2 | 5/2007 | Meaney et al. |
| 7,237,071 B2 | 6/2007 | Jahnke |
| 2001/0049801 A1 | 12/2001 | Berke et al. |
| 2002/0087828 A1 | 7/2002 | Arimilli et al. |
| 2003/0023794 A1 | 1/2003 | Venkitakrishnan et al. |
| 2003/0046356 A1 | 3/2003 | Alvarez, II et al. |
| 2003/0120702 A1 | 6/2003 | Jahnke |
| 2004/0117793 A1 | 6/2004 | Shaylor |
| 2004/0143729 A1 | 7/2004 | Bouchier et al. |
| 2004/0199902 A1 | 10/2004 | Dodson et al. |
| 2004/0210738 A1 | 10/2004 | Kato et al. |
| 2004/0215897 A1 | 10/2004 | Arimilli et al. |
| 2005/0246461 A1 | 11/2005 | Accapadi et al. |
| 2006/0037020 A1 | 2/2006 | Accapadi et al. |

OTHER PUBLICATIONS

Tan et al.; "An Object-Oriented Nano-Kernel for Operating System Hardware Support"; Proceedings of the Fourth International Workshop on Object-Orientation in Operating Systems; 1995; pp. 220-223.

Eykholt, J.R. et al.; "Multithreading: Beyond Multiprocessing-Multithreading the SunOS Kernel"; USENIX; San Antonio, Texas; Summer 1992.

Good SMP Spinlock (was -> Re: RFC: Resource Management); Mar. 3, 1996; 3 pages.

Morgenstern, D.; "Multiprocessing Ready to Boil Over at Expo"; Macweek Report; Aug. 9, 1996; 3 pages.

"Overview of the Symmetric Multiprocessing Environment"; accessed from the Internet on Aug. 13, 1998 at unix.digital.com/faqs/...rvadvtopics5.html#figWhLock; 20 pages.

Powell, M.L. et al.; "SunOS Multi-thread Architecture"; USENIX; Winter 1991; Dallas, Texas.

"Transformation of Simple Locks in Pageable Kernel"; IBM Technical Disclosure Bulletin; vol. 36, Issue 3; NN9303385; Mar. 1993; pp. 385-386.

Unisys News Release; "Unisys Launches SMP 5400 Symmetric Multiprocessing Server"; Aug. 1995; 2 pages.

* cited by examiner

SYMMETRIC MULTI-PROCESSOR SYSTEM

PRIORITY CLAIM

This application is a continuation of prior application U.S. Ser. No. 11/515,675 (now U.S. Pat. No. 7,996,843), filed Sep. 5, 2006 and incorporated herein by reference, which is a continuation of prior application U.S. Ser. No. 09/383,115 (now U.S. Pat. No. 7,103,631), filed Aug. 25, 1999 and incorporated herein by reference, which claims priority to Canadian Patent Application No. 2,245,976, filed Aug. 26, 1998.

BACKGROUND OF THE INVENTION

1. Technical Field

The present invention relates generally to computer operating systems, and more specifically, to operating system calls in a symmetric multiprocessing (SMP) environment.

2. Related Art

Generally, computer systems are designed to accept and execute various application programs provided by a User, using an operating system to manage the computer resources required to execute the application programs.

Computer systems, and multiprocessor computer systems in particular, may manage execution of application programs by grouping program steps into "threads." Multiprocessor systems may assign different threads from the same application program to be executed on different processors to optimise use of the available resources. Groups of program steps are more easily managed as threads rather than single program steps which would create very large management overheads.

In addition to the optimal groupings of program steps, these threads contain parameter values that ensure the threads are executed within the proper time, are properly synchronized with other threads, or satisfy other constraints of the system. Real time operating systems, for example, will force threads to be executed before certain time deadlines so that real time interaction is maintained.

Symmetric multiprocessing (SMP) is the processing of application programs and operating systems using multiple processors that share a common operating system and memory. A single copy of the operating system is available to all the processors who share equal access to a common memory via a communication path of some form. SMP systems may also be described as "tightly coupled" multiprocessing or "shared everything" systems.

The goal of an SMP system is to dynamically balance the workload between the available processors, optimising the use of the resources and providing the User with faster operation. Adding more processors to an SMP system results in faster operation, though completely linear improvement is not attainable because there are always critical sections of the Operation System that can only be executed one at a time. With completely linear improvement, two processors would run twice as fast as a single processor and three processors would run three times as fast as a single processor.

Because only a single copy of the operating system is available to all of the processors, two or more threads may attempt to access the same area of the operating system at the same time. Certain critical areas of the operating system will only be able to handle access by a single thread, otherwise causing unexpected or erroneous data to result. To prevent this, "locks" are commonly used to limit access to these critical areas to one processor or thread at a time. In order to access a critical area of the operating system, the thread must obtain the necessary lock or locks, and once it has completed execution, may make these locks available to other threads.

There are two common strategies to lock management: use of a single or global lock which locks the entire operating system, and use of multiple small locks which divide the operating system into isolated sections and lock each section separately.

Figure 1:
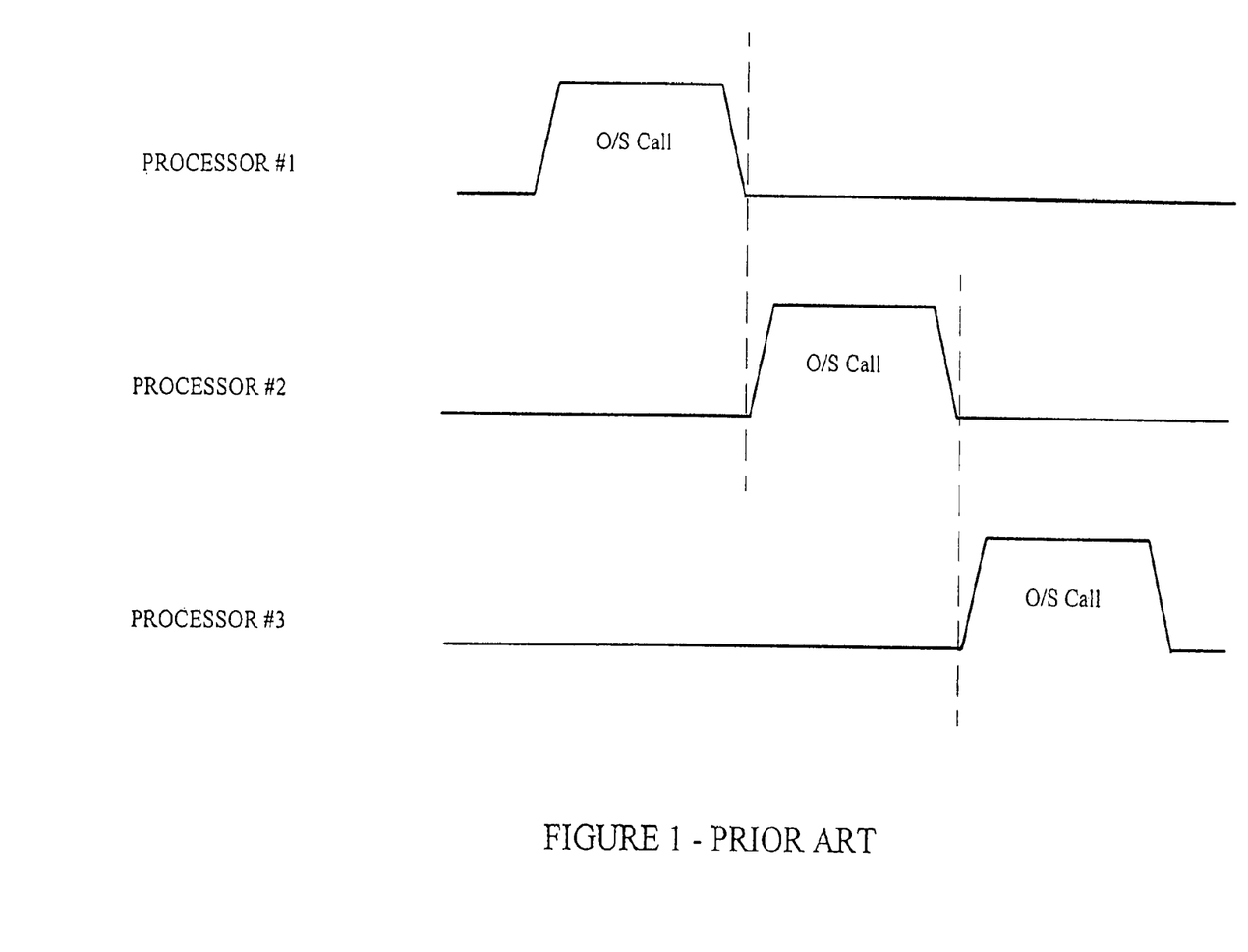
FIG. 1 presents a timing diagram of a single lock strategy as known in the art.

In general, implementation of a single lock results in the timing shown in FIG. 1. If all three Processors 1, 2 and 3 require access to the operating system at the same time, only one will be given access and the other two must remain idle. Clearly, this strategy results in the overall system operating no faster than the speed of a single processor while operating system calls are being made. Because individual processors may operate uninhibited when they are not making operating systems calls, this strategy is still faster than a single processor.

Figure 2:
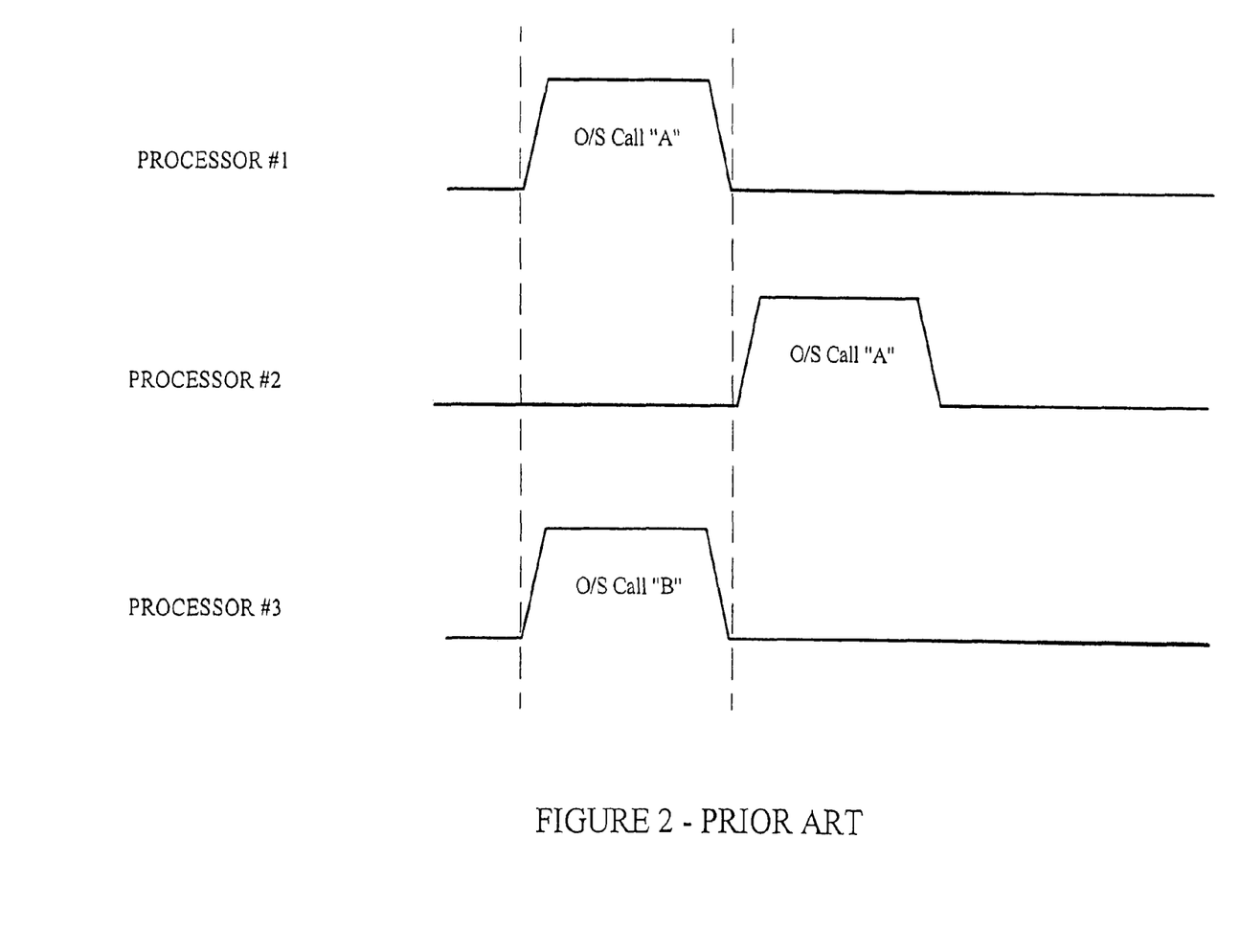
FIG. 2 presents a timing diagram of a multiple lock strategy as known in the art.

More than one processor can access the operating system if different critical areas of the operating system are identified and a separate lock provided for each of these areas. Referring to FIG. 2, an example of the timing of this second strategy is presented. In this example, all three Processors 1, 2 and 3 require access to the operating system at the same time, but Processors 1 and 2 require access to area A of the operating system, while Processor 3 requires access to area B. Therefore, Processor 3 is free to execute its call to the operating system independent of Processors 1 and 2, which must access the operating system at different times because there is only a single lock available for each operating system area. The Microsoft NT operating system is an example of an operating system applying such a multiple lock strategy.

This multiple lock strategy suffers from a number of performance problems. As the number of locks increases, the code complexity of the lock management software and number of locks to be acquired by a given thread increases. For example, a single thread may require access to several areas of the operating system, requiring it to wait for all of the necessary locks to be made available. A thread may have obtained some, but not all of the locks it requires. While it is blocked, awaiting other locks to free up, it will be blocking any other threads waiting for the locks it has already obtained. This situation can result in deadlocking, where the computer system freezes because two threads are holding and waiting for each other's locks. Even without deadlocking, this multiple lock strategy causes more time to be spent in searching and acquiring locks, and increases the difficulty of ensuring reliability.

There is also a commercial advantage to providing an operating system that is straightforward, as it is easier for driver programmers to write programs for the operating system. Use of multiple locks increases the complexity of the operating system, making the writing of driver programs more complex and time consuming, and the operation less predictable.

The most common architecture of SMP Operating Systems is described as a monolithic operating system. Monolithic operating systems incorporate most of the functionality of the operating system into a single program file, including input and output routines. Microsoft Windows CE is an example of such a monolithic operation system.

Because of the large size of monolithic operating systems, operating system calls typically take a long period of time to execute. Therefore a single lock strategy will generally result in unacceptably long time delays to the SMP system. Because of these long delays, a multiple lock strategy is preferred over the single lock for a to monolithic operating system, but suffers from the same performance problems and deadlocking hazards outlined above.

SMP systems are commonly used in personal computer and networked computer systems, high-capacity telecom switches, image processing, and aircraft simulators. As well, SMP allows customers to extend the life and increase the cost-effectiveness of their multiprocessor systems by adding processor cards and their computing power to their multiprocessors rather than buying more systems.

There is therefore a need for a method and system of Symmetric Multiprocessing that addresses the problems outlined above. This design must be provided with consideration for speed of execution, reliability, complexity and scalability.

SUMMARY

It is therefore an object of the invention to provide an improved system and method of scheduling threads in a symmetric multiprocessing operating system.

One aspect of the invention is broadly defined as a method of symmetric multiprocessing in which one or more processors, a first memory medium storing a micro kernel operating system in a machine executable form and a second memory storing a thread scheduler in a machine executable form are interconnected via a communication network, the method comprising the steps within the thread scheduler of: responding to a thread requiring a call to the micro kernel operating system by requesting a global lock; and responding to the global lock being available by performing the steps of: acquiring the global lock from the thread scheduler; performing the call to the micro kernel operating system; and releasing the global lock.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 3:
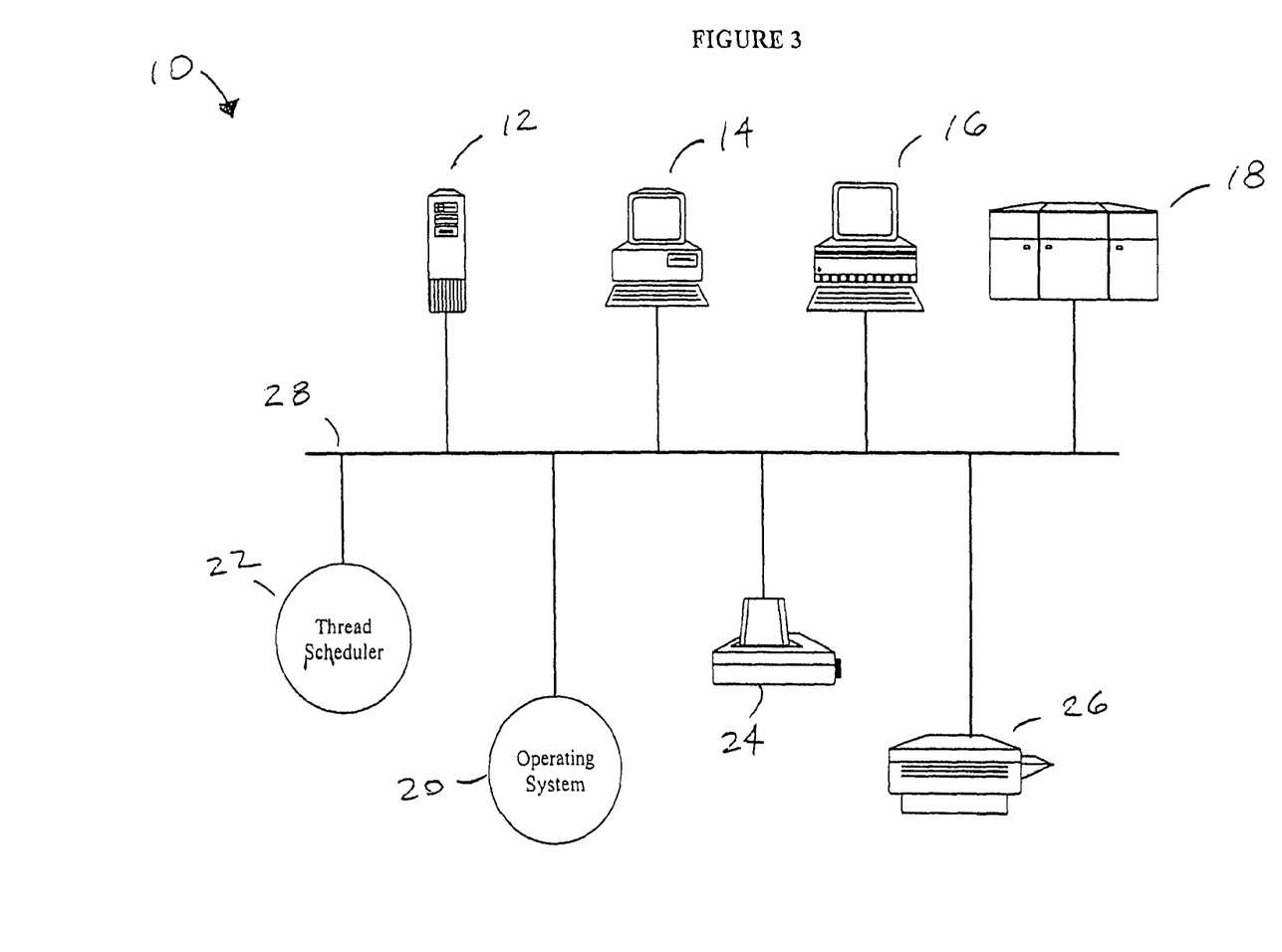
FIG. 3 presents a symbolic layout of a symmetrical multiprocessor system in a manner of the invention.

The invention may be described with respect to the general symmetric multiprocessor (SMP) layout 10 shown in FIG. 3. This figure presents an SMP layout consisting of a number of processors 12, 14, 16 and 18, operable to execute application programs, a memory medium storing an operating system 20, and a memory medium storing a thread scheduling program 22. This computer system 10 may also include a variety of peripherals such as a printer 24 and a scanner 26. These devices 12 through 26 may communicate with one another via a software bus 28.

The processors 12, 14, 16 and 18, may include personal computers, servers, micro controllers or other processing elements. Generally, each physical device on the system 10 is identified by a node address, so operation is essentially transparent to the physical arrangement. For example, while processor 12 may be operate as a server, the SMP system 10 does not treat it any differently than the other three processors 14, 16 and 18. The processors 12, 14, 16 and 18, are therefore described as "peers," each having equal access to the resources controlled by the operating system 20.

If an individual computer has a number of processors within it, each having access to the software bus 28, then each of these processors will also be considered to be a peer to any other processor accessible from the software bus 28. Processors which do not have direct access to the software bus 28 will require administration by another operating system.

The software bus 28 may consist of any manner of communication network which allows software data to be communicated between the processors 12, 14, 16 and 18 and other components of the system 10. The processors 12, 14, 16 and 18 may all reside on a single printed circuit board, in which case the software bus 28 may comprise copper tracks and the necessary input and output drivers. If the processors 12, 14, 16 and 18 comprise individual personal computers, then the software bus 28 may comprise electrical cable connections and communication hardware as known in the art.

The operating system 20 is generally stored in an executable form on a computer readable medium such as a random access memory (RAM), read only memory (ROM), optical disk (CD-ROM) or magnetic medium (hard drive or portable diskette). Of course, the operating system 20 could also be implemented by hardware means, or other means known in the art. The operating system 20 is accessible to each of the processors 12, 14, 16 and 18, and generally provides such capabilities as interprocess communications, message passing, data input and output, and timing services.

The thread manager 22 is also generally stored in an executable form on a similar computer readable memory medium accessible to each device via the software bus 28. The thread manager is not usually stored with the operating system 20 or within a processor 12, 14, 16 or 18, so that it is accessible at any time.

Figure 4:
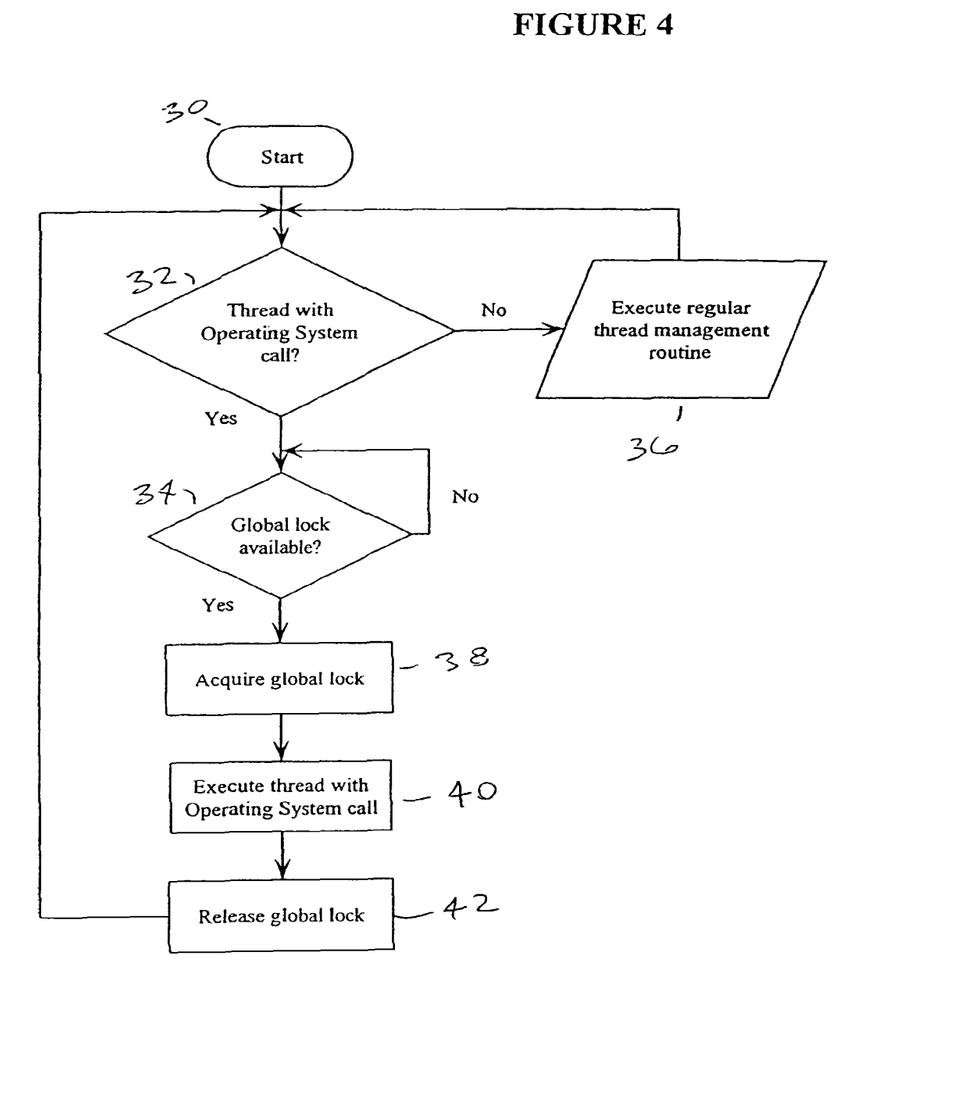
FIG. 4 presents a flow chart of a global lock management routine in a manner of the invention.

A thread scheduling program 22 which addresses the objects outlined above may be described by the flow chart of FIG. 4. This figure presents a method of symmetric multiprocessing in which one or more processors 12, 14, 16 and 18, a first memory medium storing a micro kernel operating system 20 in a machine executable form and a second memory storing a thread scheduler 22 in a machine executable form are interconnected via a communication network 28, possibly but not necessarily in the arrangement presented in FIG. 3. The method starting at step 30 comprises the steps within the thread scheduler 22 of: responding to a thread requiring access to the micro kernel operating system at step 32, by requesting a global lock at step 34. If the thread does not require access to the operating system, regular thread management is invoked at step 36. For the thread which does require access to the micro kernel operating system, the method then responds to the global lock being available by performing the steps of: acquiring the global lock at step 38; executing the thread on the micro kernel operating system 20 at step 40; and then releasing the global lock at step 42. Once the global lock has been released at step 42, control returns to step 32 to handle another thread. Until the global lock is made available to the thread, the request for the global lock remains in a tight loop at step 34.

In general, the invention requires that the SMP system take on a physical arrangement similar to that described above with respect to FIG. 3. Clearly modifications can be made to this physical arrangement which still obtain the benefits of the invention. Such modifications would be clear to one skilled in the art. As well, the invention may provide some benefit to completely different processing systems such as Asymmetric Multiprocessing systems.

The invention also requires, in a broad sense, that the operating system 20 be of a micro kernel architecture. A micro kernel operating system is one in the operating system itself provides minimal services which delegate the usual operating system functions to external processes. These services are generally described as Inter-Process Control or IPC services.

Figure 5:
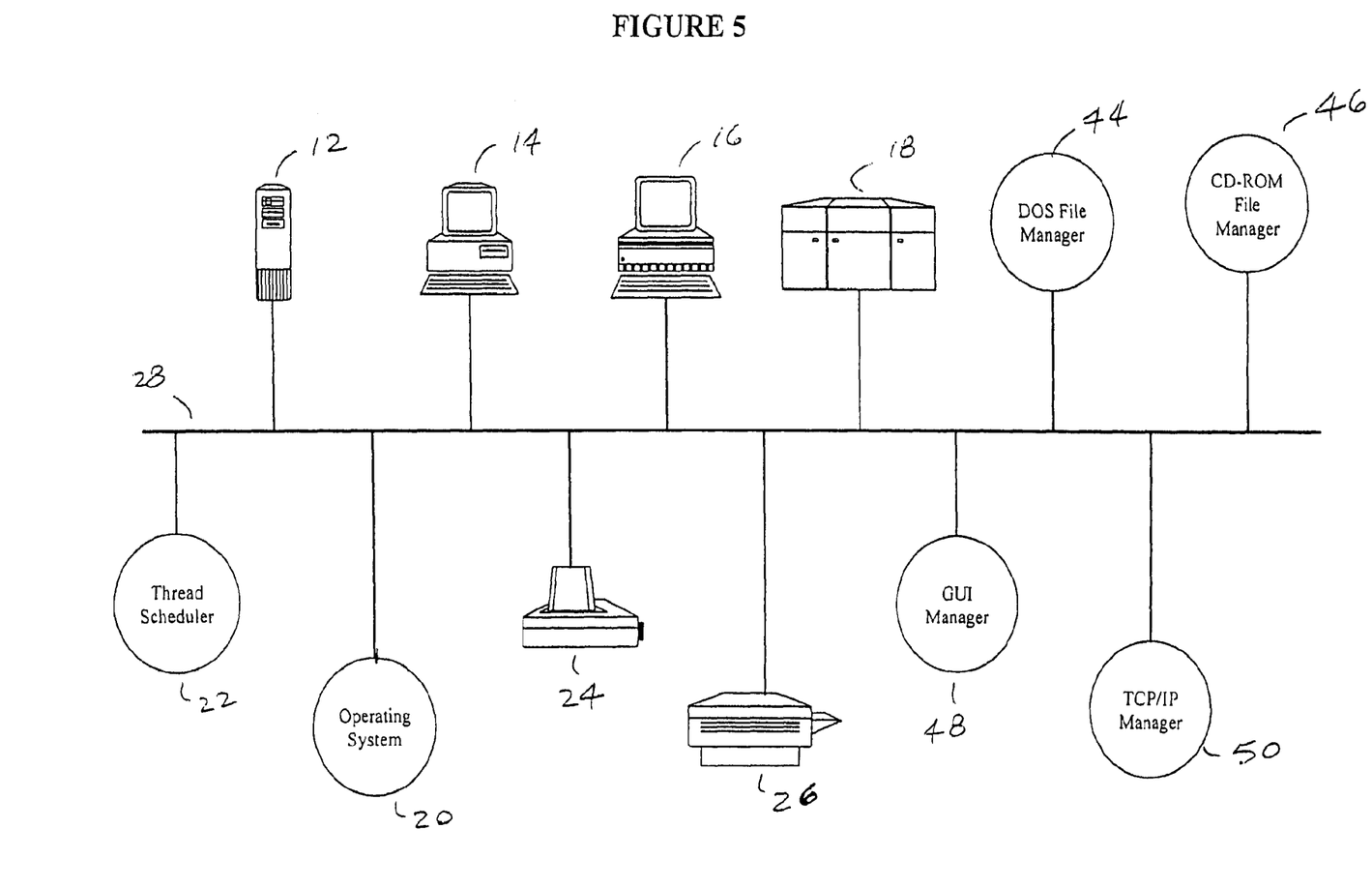
FIG. 5 presents a symbolic layout of a symmetrical multiprocessor system identifying external operating system processes in a manner of the invention.

An example of external processes which may be accessed by such a micro kernel is presented in FIG. 5. In this example, the micro kernel operating system 20 is connected to the software bus as in FIG. 3. However, additional external processes are also accessible via the software bus 28, such as the DOS file manager 44, CD-ROM file manager 46, Graphic User Interface Manager 48 and TCP/IP Manager 50. Operation and implementation of such processes are well known in the art, as are other processes which may be required. Optimal operation of the invention is obtained by implementing such processes external to the micro kernel operating system.

This modularity allows the relative size of the operating system to be greatly reduced, increasing speed of execution. Although a micro kernel is generally smaller than a monolithic operating system, it is the modularity that results in the relative improvement in speed, and allows the method of the invention to be used.

Figure 6:
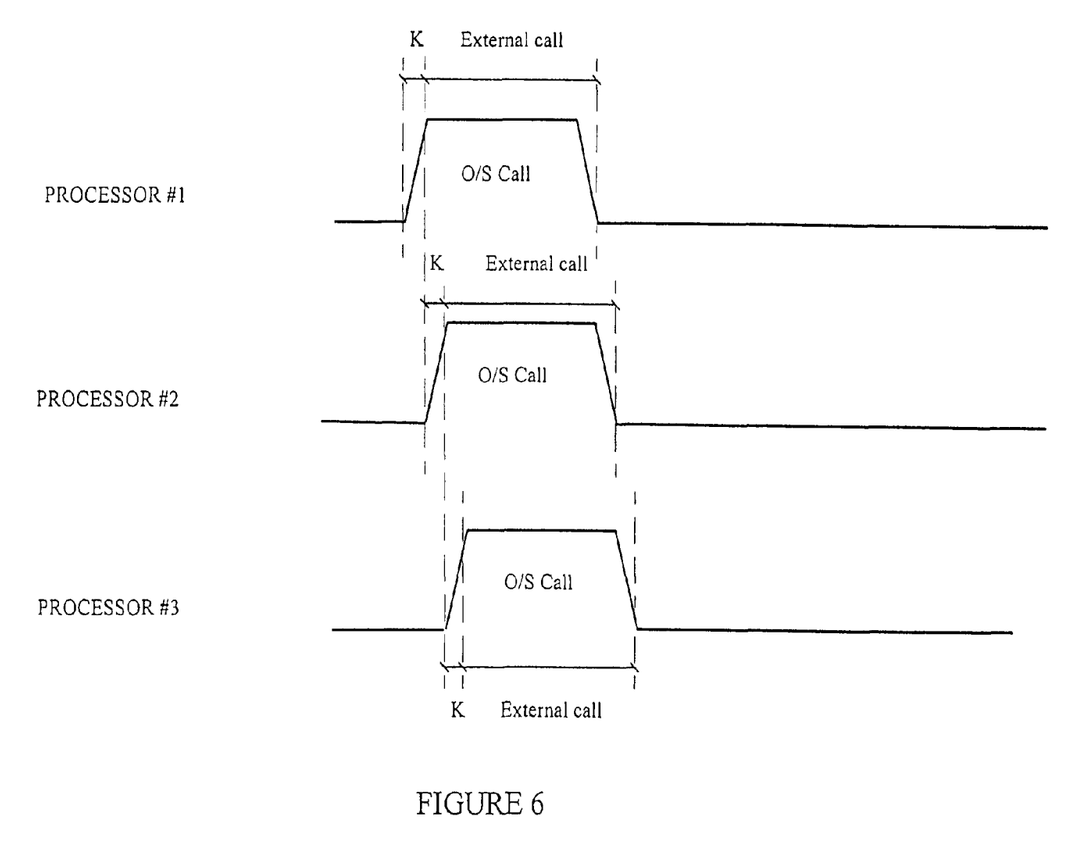
FIG. 6 presents a timing diagram of the method of the invention.

This modularity also allows the method of the invention to execute SMP much faster than the methods known in the art. FIG. 6 presents a timing diagram which compares the method of the invention to the methods described in the Background of the Invention per FIGS. 1 and 2. In FIG. 6 all three Processors 1, 2 and 3 require access to the operating system at the same time. Because the operating system is a micro kernel system, the only critical area of the operating system is in the kernel, and not in the external routine calls. The external processes are executed as priority based threads, so if the threads are scheduled properly using known techniques, there is no danger of unexpected results or errors. Therefore, a thread need only obtain the global lock to perform the kernel call, and may release it before completing the operating system call in an external process.

In FIG. 6 each Processor 1, 2 and 3 is shown to execute a kernel call designated by a "K," and an "External call." None of the kernel calls may overlap, but the external routines may. Since the kernel calls are so short, taking only microseconds to execute, the SMP system executes faster than the systems known in the art.

The relative time lengths of the calls in FIG. 6 are symbolic only. In actual practice, the external processes may not execute immediately after the kernel call if they are not required to. As well, the external processes may take hundreds or thousands of times longer to execute than the kernel call. However, the micro kernel may be designed to have a specific and predictable execution time, allowing the method of the invention to guarantee real time performance.

The degree of modularity of the operating system will depend on the processes required, and on other performance considerations. In certain applications for example, only a small number of external processes may be required. If only one or two processes are required, it may be advantageous to keep these processes with the micro kernel. Though not a micro kernel in the true sense, such an arrangement may execute a compromised version of the invention.

Clearly, the faster the micro kernel operating system executes operating system calls with respect to the exercise of collecting multiple locks, the more efficient the method of the invention will be. With consideration for the other advantages of a single lock strategy, the single lock is preferred over the multilock strategy when the time spent in the operating system call is less than the time spent searching and acquiring a large number of small locks.

Broadly speaking, the invention may be implemented by modifying known lock and thread management routines to schedule thread execution in the manner of the invention.

Determination as to whether a thread requires access to the operating system 20 at step 32 may be done in a number of manners as known in the art. For example, the thread scheduler may identify each process that a thread requires and set a boolean flag to indicate the micro kernel operating system call.

A simple compare and swap sequence may be used to obtain and release locks. Since only a single lock is being used, it is easy to set a boolean flag to indicate whether the global lock is available at step 34. Generally, locks are handed out on a FIFO (first in, first out) basis, that is, that the first thread requesting a global lock receives it. Conflicts in lock requests, that is, two or more threads requesting the global lock at the same time, must also be handled. Various techniques for handling such conflicts are known in the art, such as distinguishing the priority of Operating System calls by the nature of the call, preferring those calls which impact the real time operability of the system.

As noted above, acquiring the global lock at step 38 may be handled simply by setting a boolean flag in the thread manager, or by passing a token to the thread with the kernel call. Both techniques and others, are well known in the art. The step of releasing the global lock at step 42 may be implemented in a complementary manner to that used to implement step 38.

Execution of the critical thread at step 40 may be performed in the manner known in the art, and particular to the operating system upon which the invention is applied. No additional functionality is required to implement this step in the manner of the invention.

It should be noted however, that some operation systems use a "spin lock" to protect the operating system while it is executing. This is not to be confused with the global lock of the invention which is used manage threads. The implementation of spin locks in protecting an executing operating system is well known in the art.

Step 36 of course, may also be implemented in the manner particular to the operating system upon which the invention is being implemented.

Therefore, the invention adds a small amount of overhead to access the kernel but once accessed, the code paths are all the same.

This method provides for execution of a Symmetric Multiprocessor system with a single lock. Having one lock for the whole micro kernel requires minimal time to administer, and only adds a small amount of code. Micro kernels minimize system calls by delegating to external processes which may by executed in other processors. As a result, the call to the operating system kernel takes very little time.

Because only a single lock is required, the system is able to identify the status of and acquire the lock very quickly, and there is no danger of deadlocking as in the case of multiple locks.

In contrast to monolithic operating systems, micro kernel architectures distribute the functionality of the operating system into separate files as much as possible, leaving only a kernel with message passing capabilities to administer the operating system. All file handling, input and output handling, and other operations are provided in external processes.

Because traditional monolithic kernels contain the bulk of all operating system services, they require numerous performance-robbing spin-locks in the main code paths to support SMP. In contrast, the invention uses a lean micro kernel architecture requiring only a single lock, resulting in faster performance.

Simpler implementation of SMP leads to fewer bugs and better performance. Complete linear speed up with added processors, is the ultimate goal of an SMP system, but can not be attained because there are always critical sections of the operating system that can only be executed one at a time. However, the method of the invention provides a method which will tend towards linear speed ups with reductions in the size of the micro kernel, reducing the length of the critical code to execute.

In general, a single lock SMP can only be efficiently applied to a micro kernel operating system and not to a monolithic operating system. As indicated in FIG. 1 and described above, a single lock SMP applied to a monolithic operating system results in poor performance due to the long monolithic kernel calls. The lock must wait until the kernel call has finished executing before it could take control. While waiting for the long kernel call to finish, the additional processors are idle.

However, a monolithic operating system may obtain some of the benefit of the invention by minimizing the code in the kernel and moving functionality to external locations. Message passing functions would be required for the operating system to access external processes, but such techniques are known in the art. This reduction in the size of the operating system kernel would reduce the time required to execute operating system calls, allowing the invention to be applied.

In the preferred embodiment, it is intended to implement the invention as a generic and commercially available product, as opposed to customized. The SMP functionality may be implemented as an add on to the basic operating system software, giving the User the option of either uniprocessor or SMP implementation. Basically only one file handling the global lock would have to be enabled to change from uniprocessor operation to SMP. The balance of the operating system and the user processes are unchanged, and have no knowledge of which mode the system is operating.

The most common implementation would be for an Intel X86 platform, though the invention may be applied to any platform by changing the process to suit the necessary platform API. Implementation on MIPS or PPC for example, can easily be made by modifying the SMP hardware and operating system to interact with the hardware of the new platform.

In the preferred embodiment, the invention will be applied to a real time operating system (RTOS). In a real time operating system it is required that certain functions be executed within certain periods of time. Therefore, to implement the invention, it may be necessary to prioritize operating system calls in order of how their respective call latencies impact the real time operation. This would for example, allow the kernel calls which delay the User the most, to be executed first.

As will be described with respect to FIG. 7, such an implementation requires that execution of non-critical threads may be pre-empted so that critical threads may be executed on the operating system. "Pre-emption" is the act of one thread substituting itself for another executing, dispatchable thread on a processor. For example, if a machine interrupt is received while a thread with an operating system call is holding the global lock and executing, the processor must go into an idle loop while the machine interrupt is handled, then returns and continues doing the spin. In a real time system, it is generally presumed that the machine interrupt is of the highest priority, so the delay of the kernel call being pre-empted is of secondary concern to the execution of the machine interrupt.

Implementation of the invention with pre-emption provides a further performance improvement over the prior art, by allowing real time operations to preempt non-real time operations.

Figure 7:
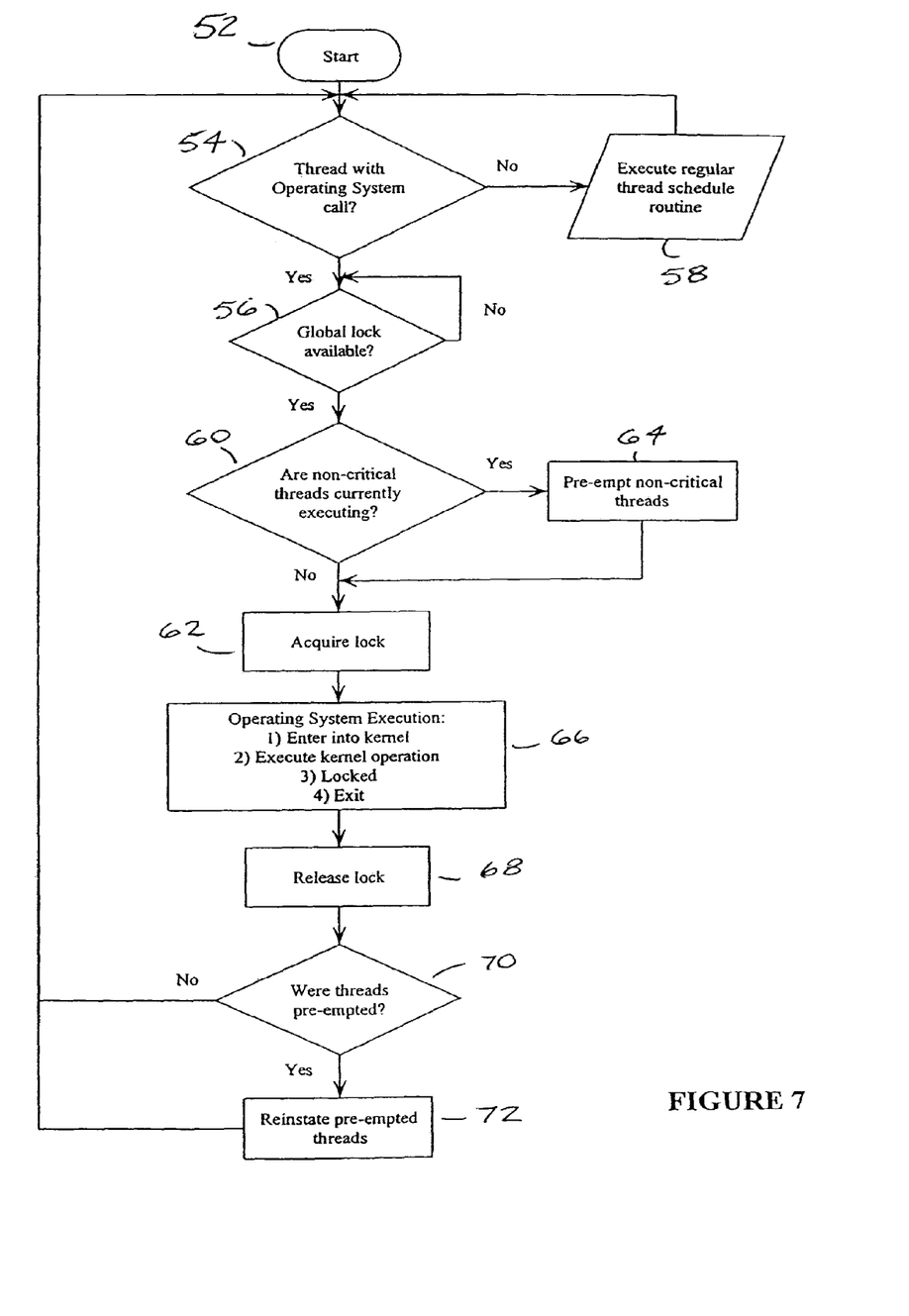
FIG. 7 presents a flow chart of a global lock management routine in the preferred embodiment of the invention.

FIG. 7 presents a flow chart of the method of the preferred embodiment. Again, a physical arrangement similar to FIG. 3 or 5 is suitable for such a method, though it is not necessary to have the same components or physical arrangement.

The method starting at step 52 builds on the method described with respect to FIG. 4. In this case, the thread scheduler responds to a thread requiring access to the pre-emptable micro kernel operating system at step 54, by requesting the global lock at step 56, while non-critical threads are managed in the manner known in the art at step 58. The thread scheduler responds to the global lock being available at step 56 by determining whether non-critical threads are currently running on the operating system 20 at step 60. If no such threads are currently executing, then the global lock may be acquired at step 62, otherwise the non-critical threads must be pre-empted at step 64.

As noted above, in the preferred embodiment, real time operation is provided by the pre-emption of lower-priority threads currently being executed. Such threads are therefore pre-empted at step 64 before the global lock is acquired. Existing thread-based operating systems have the functionality to handle machine interrupts which suspend execution of a thread to handle the interrupt. In a manner of the invention, a similar routine may be used to pre-empt execution of a thread to allow execution of the thread requiring access to the operating system. The routine which performs the pre-empting may also set a boolean flag to indicate that threads were pre-empted.

Once the global lock has been acquired at step 62, the thread call to the operating system 20 may be executed at step 66. The requires of this call will depend on the platform upon which the operating system is running, and the nature of the operating system itself. Briefly, the kernel call in the preferred embodiment will comprise execution of the following steps:

1. Entry into the Kernel

This step includes execution of code required to pass the thread call into the kernel for execution. As noted above, some operating systems may require a special spin lock to be acquired as part of this step, to protect the operating system. This spin lock is different from the global lock which is being used as a management tool. Before leaving this step, the spin lock may be released. During this step, no pre-emption is allowed and interrupts are not handled.

2. Prologue

During this step, the necessary initializations are being executed to set up the kernel operation at step 4. No kernel data structures may be modified during this step.

However, the kernel may access or verify that it can access user data during this step. This step is fully pre-emptable, and interrupts may be handled.

3. Kernel Operation

This step includes execution of the thread call to the operating system kernel. As described above, this call may comprise one of a number of file handling, data input or output, or other operating system functions. Being a micro kernel design, the bulk of the code required to handle these functions is resident in external processes, so the kernel execution generally just sets up the external process call for execution. This is the only step of the kernel call during which kernel data structures may be modified. During this period the operating system is not pre-emptable, though interrupts may be handled.

4. Epilogue

This optional step is used to complete the execution of the kernel call. Similar to the prologue of step 2 above, user data may be accessed during this step, or verification can be made that user data may be accessed. During this period the operating system is fully pre-emptable and interrupts may be handled.

5. Exit

This stage performs the return of the thread, or possibly an error message, from the operating system kernel to the processor executing the thread. Similar to the Entry step 1 above, the spin lock may be acquired at the beginning of this step and released at the end, to protect the operating system. No pre-emption is allowed during this stage, and no interrupts may be handled.

To summarize the accessibility of the kernel during step 66:

| Step | Pre-emption | Interrupts |
| --- | --- | --- |
| 1. Entry | Not allowed | Not handled |
| 2. Prologue | Allowed | Handled |
| 3. Kernel Operation | Not allowed | Handled |
| 4. Epilogue (optional) | Allowed | Handled |
| 5. Exit | Not allowed | Not handled |

The global lock may then be released at step 68. As noted above, this may be done in a complementary manner to the method used to acquire the lock at step 62.

Determination is then made at step 70 as to whether any threads were preempted at step 64. This determination may be made on the status of a boolean flag indicating that pre-emptions were made, or by the existence of thread identities and parameters in an array used to store the pre-empted threads. If no threads were preempted, then the routine returns to step 54, otherwise pre-empted threads must be reinstated at step 70. Reinstatement of these threads may be performed in the manner that complements how the threads were pre-empted at step 56.

As described with respect to the general case herein above, known global lock and thread management routines may be modified to effect the invention.

The invention may also be applied with further optional features as known in the art, such as:

1. Returning threads to the processor they ran on previously to optimize memory cache performance.
2. Use of processor "affinity masking" to select which processor each thread may run on, further optimizing performance.
3. Use in embedded systems. Because of the small amount of memory required, scalability to add functionality, and performance, the invention may be applied to embedded applications.
4. Routing machine interrupts to the processor handling the lowest priority threads.

Adding a spin lock acquire and release around the Prologue step 2 and/or Epilogue step 4 allowing multiple calls to be in the Prologue at the same time.

However, if a call was in the Kernel Operation step 3 at the time, a new call would not be able to access the Prologue step 2 or Epilogue step 4.

Modifications to larger or monolithic operating systems could be made to apply the teachings of the invention and realize performance improvements. As well, hybrids of the thread management system of the invention with existing management strategies may be appropriate to particular thread sizes or applications.

The operating system of the invention could be embedded into a micro controller, digital signal processor or intelligent instrumentation, operating as a piece of electronic hardware or as part of the electronic system. The invention could also be implemented in the form of machine executable software; the method of the invention being transmitted as electronic signals, or stored in machine readable or executable form in random access memory (RAM), read only memory (ROM), optical disk (CD-ROM) or magnetic storage media (hard drive or portable diskette).

An operating system in a manner of the invention could be applied to a broad range of applications, including stand-alone uniprocessor systems, multiprocessor or network-connected systems, servers, palm top or laptop computers, cellular telephones, automobile controllers and smart process control instruments. Again, such implementations would be clear to one skilled in the art, and does not take away from the invention.

Since the invention offers the best possible utilization of available Processor cycles, it's ideal for very high-end real-time applications such as high-capacity telecom switches, image processing, and aircraft simulators.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of symmetric multiprocessing in which one or more processors are connected with a memory that stores an operating system in a machine executable form, wherein the operating system comprises a critical area and a non-critical area, the method comprising the steps of:

receiving a first operating system call from a first thread, wherein the first operating system call comprises a kernel call portion that requires access to the critical area of the operating system and an external call portion that requires access to the non-critical area of the operating system;

acquiring a global lock associated with the operating system for the first thread before accessing the critical area of the operating system for the kernel call portion of the first operating system call without locking the non-critical area of the operating system, wherein the global lock is associated with the entire critical area of the operating system and prevents any other threads from accessing the critical area while the global lock is applied to the critical area for the first thread;

receiving a second operating system call from a second thread that requires access to the non-critical area of the operating system;

granting the second thread access to the non-critical area of the operating system;
executing the first thread concurrently with the second thread; and
releasing the global lock upon completing the kernel call portion of the first operating system call.

2. The method of claim 1, wherein the step of executing comprises executing the first thread on a first processor of the one or more processors concurrently with execution of the second thread on a second processor of the one or more processors.

3. The method of claim 1, further comprising:
receiving an operating system call from a third thread that requires access to the critical area of the operating system; and
blocking the third thread from accessing the critical area of the operating system while the global lock is reserved for the first thread.

4. The method of claim 1, wherein the second operating system call comprises a kernel call portion that requires access to the critical area of the operating system and an external call portion that requires access to the non-critical area of the operating system, the method further comprising:
managing the global lock of the operating system to prevent overlapping execution of the kernel call portion of the first operating system call and the kernel call portion of the second operating system call.

5. The method of claim 4, further comprising allowing overlapping execution of the kernel call portion of the first operating system call and the external call portion of the second operating system call.

6. The method of claim 4, further comprising allowing overlapping execution of the external call portion of the first operating system call and the kernel call portion of the second operating system call.

7. The method of claim 1, where the operating system has a micro kernel architecture.

8. A computer system comprising:
one or more processors;
a first memory storing an operating system in a machine executable form, wherein the operating system comprises a critical area and a non-critical area;
a second memory storing a lock manager in an machine executable form; and
a communication network interconnecting the one or more processors, the first memory, and the second memory;
wherein the lock manager is configured to:
receive a first operating system call from a first thread, wherein the first operating system call comprises a kernel call portion that requires access to the critical area of the operating system and an external call portion that requires access to the non-critical area of the operating system;
acquire a global lock associated with the operating system for the first thread to access the critical area of the operating system for the kernel call portion of the first operating system call without locking the non-critical area of the operating system, wherein the global lock is associated with the entire critical area of the operating system and prevents any other threads from accessing the critical area while the global lock is applied to the critical area for the first thread;
receive a second operating system call from a second thread that requires access to the non-critical area of the operating system;
grant the second thread access to the non-critical area of the operating system;
allow the one or more processors to execute the first thread concurrently with the second thread; and
release the global lock upon completing the kernel call portion of the first operating system call.

9. The computer system of claim 8, wherein a first processor of the one or more processors is configured to execute the first thread concurrently with execution of the second thread on a second processor of the one or more processors.

10. The computer system of claim 8, wherein the lock manager is further configured to:
receive an operating system call from a third thread that requires access to the critical area of the operating system; and
block the third thread from accessing the critical area of the operating system while the global lock is reserved for the first thread.

11. The computer system of claim 8, wherein the second operating system call comprises a kernel call portion that requires access to the critical area of the operating system and an external call portion that requires access to the non-critical area of the operating system, wherein the lock manager is further configured to:
manage the global lock of the operating system to prevent overlapping execution of the kernel call portion of the first operating system call and the kernel call portion of the second operating system call.

12. The computer system of claim 11, wherein the lock manager is further configured to allow overlapping execution of the kernel call portion of the first operating system call and the external call portion of the second operating system call.

13. The computer system of claim 11, wherein the lock manager is further configured to allow overlapping execution of the external call portion of the first operating system call and the kernel call portion of the second operating system call.

14. The computer system of claim 8, where the operating system has a micro kernel architecture.

15. A non-transitory machine-readable medium with software stored thereon, wherein the software is executable by a processor to cause the processor to perform the steps of:
receiving a first operating system call from a first thread, wherein the first operating system call comprises a kernel call portion that requires access to a critical area of an operating system and an external call portion that requires access to a non-critical area of the operating system;
acquiring a global lock associated with the operating system for the first thread to access the critical area of the operating system for the kernel call portion of the first operating system call without locking the non-critical area of the operating system, wherein the global lock is associated with the entire critical area of the operating system and prevents any other threads from accessing the critical area while the global lock is applied to the critical area for the first thread;
receiving a second operating system call from a second thread that requires access to the non-critical area of the operating system;
granting the second thread access to the non-critical area of the operating system;
executing the first thread concurrently with the second thread; and
releasing the global lock upon completing the kernel call portion of the first operating system call.

16. The non-transitory machine-readable medium of claim 15, wherein the step of executing comprises executing the first thread on a first processor of the one or more processors concurrently with execution of the second thread on a second processor of the one or more processors.

17. The non-transitory machine-readable medium of claim 15, wherein the software is executable by the processor to cause the processor to perform the steps of:
receiving an operating system call from a third thread that requires access to the critical area of the operating system; and
blocking the third thread from accessing the critical area of the operating system while the global lock is reserved for the first thread.

18. The non-transitory machine-readable medium of claim 15, wherein the second operating system call comprises a kernel call portion that requires access to the critical area of the operating system and an external call portion that requires access to the non-critical area of the operating system, wherein the software is executable by the processor to cause the processor to perform the step of:
managing the global lock of the operating system to prevent overlapping execution of the kernel call portion of the first operating system call and the kernel call portion of the second operating system call.

19. The non-transitory machine-readable medium of claim 18, wherein the software is executable by the processor to cause the processor to perform the step of allowing overlapping execution of the kernel call portion of the first operating system call and the external call portion of the second operating system call.

20. The non-transitory machine-readable medium of claim 18, wherein the software is executable by the processor to cause the processor to perform the step of allowing overlapping execution of the external call portion of the first operating system call and the kernel call portion of the second operating system call.

21. The non-transitory machine-readable medium of claim 15, where the operating system has a micro kernel architecture.

22. A method of symmetric multiprocessing in which one or more processors are connected with a first memory storing an operating system in a machine executable form, wherein the operating system comprises a critical area and a non-critical area, the method comprising the steps of:
responding to a first thread requiring a first operating system call to the critical area of the operating system by requesting a global lock of the operating system for the first thread, wherein the global lock is associated with the entire critical area of the operating system and prevents any other threads from accessing the critical area while the global lock is applied to the critical area for the first thread;
responding to the global lock being available by performing the steps of:
acquiring the global lock for the first thread to access the critical area of the operating system without locking the non-critical area of the operating system;
performing the first operating system call to the critical area of the operating system,
receiving a second operating system call from a second thread that requires access to the non-critical area of the operating system;
granting the second thread access to the non-critical area of the operating system;
executing the first thread concurrently with the second thread; and
releasing the global lock.

23. The method of claim 22, wherein the first operating system call comprises a kernel call portion that requires access to the critical area of the operating system and an external call portion that requires access to the non-critical area of the operating system;
wherein the step of acquiring the global lock comprises the step of acquiring the global lock for the first thread to access the critical area of the operating system for the kernel call portion of the first operating system call; and
wherein the step of releasing the global lock comprises the step of releasing the global lock upon completing the kernel call portion of the first operating system call.

24. The method of claim 22, where the operating system has a micro kernel architecture.

* * * * *